US 7,761,320 B2

(12) United States Patent
Fliess et al.

(10) Patent No.: US 7,761,320 B2
(45) Date of Patent: Jul. 20, 2010

(54) SYSTEM AND METHOD FOR GENERATING ROLE TEMPLATES BASED ON SKILLS LISTS USING KEYWORD EXTRACTION

(75) Inventors: Kevin V. Fliess, Mountain View, CA (US); Udo Waibel, Foster City, CA (US); Dennis B. Moore, Burlingame, CA (US); Christoph Vorgerd, Heidelberg (DE)

(73) Assignee: SAP Aktiengesellschaft (DE)

(*) Notice: Subject to any disclaimer, the term of this patent is extended or adjusted under 35 U.S.C. 154(b) by 1627 days.

(21) Appl. No.: 10/628,082

(22) Filed: Jul. 25, 2003

(65) Prior Publication Data

US 2005/0021383 A1    Jan. 27, 2005

(51) Int. Cl.
G06F 17/28    (2006.01)
(52) U.S. Cl. ............... 705/8; 705/7; 705/9; 705/10; 455/417; 455/414.1; 707/3; 707/5; 707/6; 707/100; 707/513
(58) Field of Classification Search ............ 705/7, 705/8, 9, 10
See application file for complete search history.

(56) References Cited

U.S. PATENT DOCUMENTS

| | | | |
|---|---|---|---|
| 6,067,548 A | | 5/2000 | Cheng |
| 6,275,812 B1 * | | 8/2001 | Haq et al. ............ 705/11 |
| 6,446,061 B1 * | | 9/2002 | Doerre et al. .......... 1/1 |
| 6,681,223 B1 * | | 1/2004 | Sundaresan ............ 707/6 |
| 2001/0039508 A1 * | | 11/2001 | Nagler et al. .......... 705/11 |
| 2002/0194379 A1 * | | 12/2002 | Bennett et al. ........ 709/246 |
| 2003/0037032 A1 * | | 2/2003 | Neece et al. .......... 707/1 |
| 2004/0203679 A1 * | | 10/2004 | McCormack et al. .... 455/417 |
| 2004/0236714 A1 * | | 11/2004 | Eisenberger et al. ..... 707/1 |

OTHER PUBLICATIONS

Vasconcelos et al., A Group Memory System for Corporate Knowledge Management: An Ontological Approach, Proceedings of the 1st European Conference on Knowledge Management (ECKM'2000) Bled School of Management, Slovenia, Oct. 2000, p. 1-13.*
Sure et al., Leveraging Corporate Skill Knowledge—From ProPer to OntoProPer, Proceedings of the Third International Conference on Practical Aspects of Knowledge Management, 2000, p. 1-12.*
Embley et al., Ontology-Based Extraction and Structuring of Information from Data-Rich Unstructured Documents, In Proceedings of the Conference on Information and Knowledge Management (CIKM'98), Washington D.C., 1998, p. 1-8.*

* cited by examiner

*Primary Examiner*—Beth V. Boswell
*Assistant Examiner*—Justin M Pats
(74) *Attorney, Agent, or Firm*—Holland & Knight LLP; Brian J. Colandreo, Esq.

(57) ABSTRACT

A project role generation system includes a role generator. The role generator executes a computer-implemented method for defining one or more roles for a project. The role generator generates a skills list for a project based on a comparison between a skills taxonomy and key words from unstructured text associated with the project. The role generator further generates one or more role templates for the project based on a comparison of at least a portion of the generated skills list and one or more predefined roles, wherein each role template includes one or more skills associated with fulfilling a role.

17 Claims, 4 Drawing Sheets

SYSTEM AND METHOD FOR GENERATING ROLE TEMPLATES BASED ON SKILLS LISTS USING KEYWORD EXTRACTION

BACKGROUND

The following description relates to role generation techniques such as may be used, for example, with enterprise management systems.

Recent developments in enterprise management systems have attempted to integrate multiple legacy systems, typically found in existing heterogeneous information technology (IT) environments, into a common enterprise management solution. Such integration processes generally involves unifying access to multiple resources, including applications (e.g., Enterprise Resource Planning ("ERP") applications, resource and project management ("RPM") applications, and data warehouses), services (including Web-based, client-server, and other network services), and information (e.g., stored documents, Internet and intranet information, databases, and knowledge bases). Benefits of unifying such resources typically include increasing the value of the individual resources through integrated operation, allowing employees to collaborate on projects, and increasing the productivity and efficiency of the entire organization.

Several solutions have emerged to help users locate relevant resources, such as applications, services, and/or information. For example, enterprise portals may help filter resources through the use of roles. In an enterprise portal that implements roles, each individual in the enterprise may be deemed to fill one or more roles, under which the individual takes on specific activities, responsibilities and tasks, and the portal presents the individual with choices based on his or her assigned role. Processes become embedded in roles, and users assuming these roles are responsible for ensuring that the associated process tasks are carried out.

A role defines an activity set that an individual undertakes in order to achieve a desired business objective. An individual can assume several different roles all at the same time. A role, rather than an individual, defines how a business process is fulfilled and, in turn, how the business process leads to achieving a particular business objective successfully. A role is defined by skills, which in turn define the qualifications required to perform a particular task. Additional properties may also be used in defining a role, including but not limited to availability and/or location of an individual, desire of an individual to work for a particular manager or with particular co-workers, an indicated desire to gain new skills, and a desire to work on a project of a particular type or with a particular subject.

Roles within an enterprise tend to evolve, or otherwise change, frequently. Accordingly, in a role-based portal, the prevalence of such change means that every role defined in the portal must be flexible and dynamic enough to handle such change. Change can be driven through a role. In order to be effective, however, a role-based system typically must have precisely-defined roles that maximize use of an enterprise's human resources. Inherent in role definition is the responsibility to integrate content from various internal and external sources. Role definition, therefore, typically should be carefully considered to ensure that the workplace not only meets the enterprise's working, legal, and processing requirements, but also can be easily and flexibly maintained.

Roles can be defined at various different levels including, e.g., the project level. Project-based role definition tends to be a complex process. In a typical scenario, management first defines what it hopes is an effective number and type of roles according to project requirements, typically within budgetary and resource constraints. For example, informational access requirements may be identified that are generic enough for wide applicability, yet still meet project objectives. Although information a CEO needs or wants tends to differ from that of a field technician, providing a different access mechanism for each individual could be cost-prohibitive. Management also typically defines the required skills for each role. Next, management may determine the skills and qualifications of individuals who are available to staff those roles. Then management matches those skills to the defined roles, and modifies one or more roles to fit the skills of available individuals. Each of these steps tends to be costly in terms of time and other resources.

SUMMARY

A method and system are disclosed for generating one or more roles for a project or any other undertaking within an organization. In one aspect, a computer-implemented method for defining one or more roles for a project involves generating a skills list for a project based on a comparison between a skills taxonomy and key words from unstructured text associated with the project. Then, one or more role templates for the project are generated based on a comparison of at least a portion of the generated skills list and one or more predefined roles. Each role template may include one or more skills associated with fulfilling a role.

A project role generator system may include a skills taxonomy, an archive of at least one predefined project role, and a search engine. The search engine retrieves unstructured text from one or more sets of unstructured data, and extracts key words from the unstructured text associated with a project. The system also includes a role generator module that is configured to generate one or more role templates for the project based on the key words, predefined roles, and the skills taxonomy.

The role generation system and techniques described herein may provide one or more of the following advantages. For example, these role generation techniques facilitate intelligent text mining of an enterprise's information and knowledge base to dynamically create one or more roles for a project. The information and knowledge base typically includes multiple disparate sets of unstructured data, each bearing some relationship to a project for which roles are needed to be generated. For instance, the unstructured data can include project plans, job postings, project requests and/or requirements documents, and the like.

The one or more role templates, i.e. role definitions, can be provided to a user interface for adjustment or modification. The role templates, modified or not, can also be accumulated along with the predefined roles to build a role database and role-generation knowledge base. Role definitions can be used to create job descriptions for finding candidates for full-time or temporary jobs. Role definitions also can be used in various planning scenarios, including but not limited to capacity planning, recruitment planning, and contractor planning, or for contractor budgeting and recruiting, for example. Role definitions can be searched for reuse in other projects, or searched by employees, contractors, or prospective employees seeking a job. The sources of information used to generate role definitions may be continuously scanned for adding new roles.

Accordingly, roles for a project may be generated dynamically and defined in a manner that tends to minimize time and expense.

DRAWING DESCRIPTIONS

These and other aspects will now be described in detail with reference to the following drawings.

Like reference symbols in the various drawings indicate like elements.

DETAILED DESCRIPTION

Figure 1:
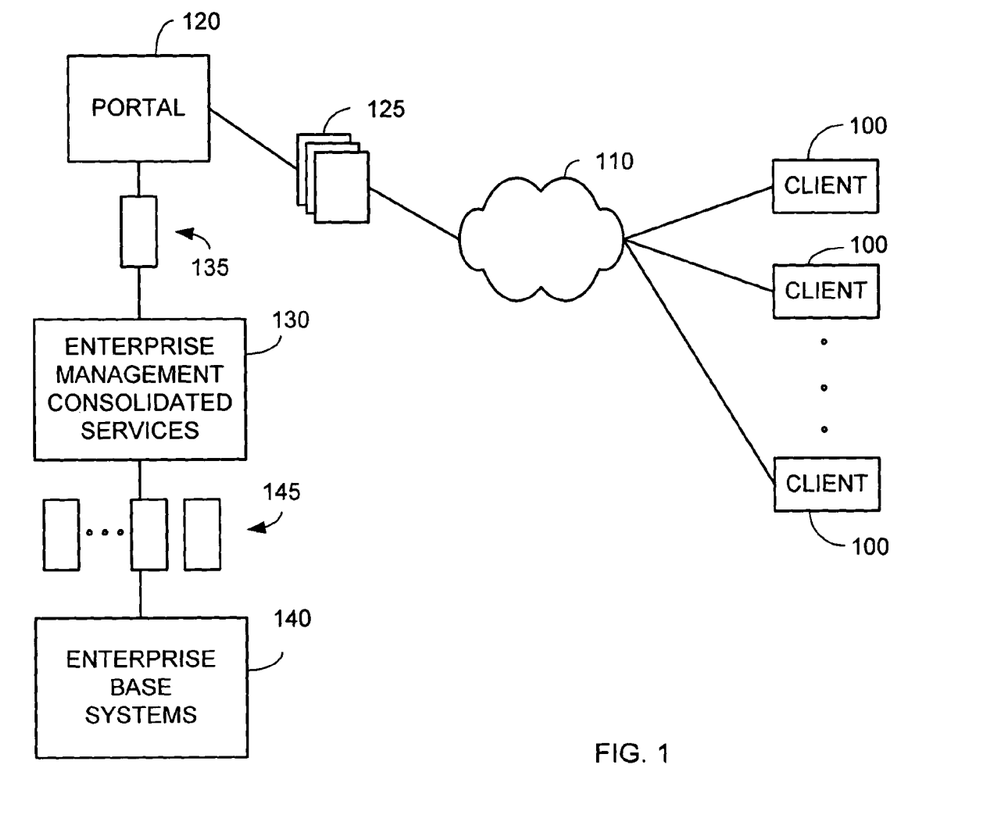
FIG. 1 is a block diagram illustrating an example of an integrated enterprise management system.

FIG. 1 is a block diagram illustrating an example integrated enterprise management system. Multiple clients 100 can access data over a network 110 through a portal 120. The network 110 can be any communication network linking machines capable of communicating using one or more networking protocols, e.g., a local area network (LAN), a wide area network (WAN), an enterprise network, a virtual private network (VPN), and/or the Internet. The clients 100 can be any machines or processes capable of communicating over the network 110. The clients 100 can be web browsers and optionally can be communicatively coupled with the network 110 through a proxy server (not shown).

A portal 120 provides a common interface to program management services. The portal 120 receives requests from the clients 100 and generates information views 125 (e.g., Web pages) in response. The portal 120 can implement a user roles-based system to personalize the common interface and the information views 125 for a user of a client 100. A user can have one or more associated roles that allow personalized tailoring of an interface presented to a user through the generated information views 125.

The portal 120 communicates with an enterprise management system 130 that consolidates multiple application services. The portal 120 receives data 135 from the enterprise management system 130 for use in fulfilling the requests from the clients 100. The enterprise management system 130 can provide integrated application services to manage business objects and processes in a business enterprise. The business objects and processes can be resources (e.g., human resources), development projects, business programs, inventories, clients, accounts, business products, and/or business services.

The enterprise management system 130 communicates with enterprise base systems 140 to obtain multiple types of data 145. The enterprise base systems 140 can include various existing application services, such as human resource management systems, customer relationship management systems, financial management systems, project management systems, knowledge management systems, business warehouse systems, time management systems, and electronic file and/or mail systems. The enterprise base systems 140 also can include an integration tool, such as the eXchange Infrastructure ("XI") provided by SAP, that provides another level of integration among base systems. The enterprise management system 130 can consolidate and integrate the data and functionality of such systems into a single enterprise management tool.

This enterprise management tool can include systems and techniques to facilitate creation of new applications within the enterprise management system 130. These new applications, referred to as cross-functional or composite applications, can readily draw on the resources of the enterprise base systems 140 to cross over traditional enterprise application boundaries and handle new business scenarios in a flexible and dynamic manner, allowing rapid and continuous innovation in business process management. A virtual business cycle can be created using such cross-functional applications, where executive-level business strategy can feed management-level operational planning, which can feed employee-level execution, which can feed management-level evaluation, which can feed executive-level enterprise strategy. The information generated at each of these stages in the enterprise management cycle can be readily consolidated and presented by the enterprise management system 130 using customized cross-functional applications. The stages can provide and consume determined services that can be integrated across multiple disparate platforms.

The portal 120, enterprise management system 130 and enterprise base systems 140 can reside in one or more programmable machines, which can communicate over a network or one or more communication busses. For example, the base systems 140 can reside in multiple servers connected to an enterprise network, and the portal 120 and the enterprise management system 130 can reside in a server connected to a public network. Thus, the system can include customized, web-based, cross-functional applications, and a user of the system can access and manage enterprise programs and resources using these customized web-based, cross-functional applications from anywhere that access to a public network is available.

Figure 2:
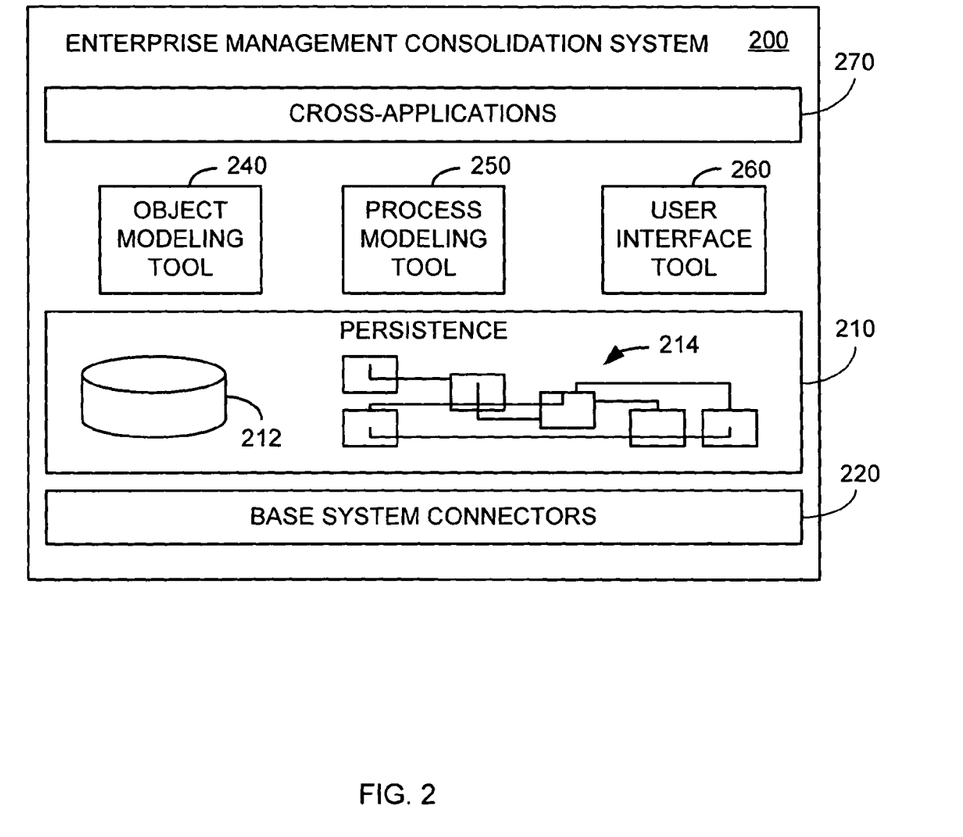
FIG. 2 is a block diagram illustrating components of an example enterprise management consolidation system.

FIG. 2 is a block diagram illustrating components of an example enterprise management consolidation system 200. The system 200 can include a persistence layer 210 and one or more base system connectors 220. The base system connectors 220 enable data exchange and integration with base systems. The base system connectors 220 can include a BC (Enterprise Connector) interface, an ICM/ICF (Internet Communication Manager/Internet Communication Framework) interface, an Encapsulated PostScript® (EPS) interface, or other interfaces that provide Remote Function Call (RFC) capability.

The persistence layer 210 provides the enterprise management consolidation system 200 with its own database 212 and data object model 214. The database 212 and the object model 212 provide a consolidated knowledge base to support multiple enterprise management functions, including functions created as cross-applications 270. Active communication between the persistence layer 210 and the base systems can provide a tight linkage between real-time operational data from multiple base systems and an integrated enterprise analysis tool to allow strategic enterprise management and planning.

The data object model 214 can represent a subset of data objects managed by the base systems. Not all of the data aspects tracked in the base systems need to be recorded in the data object model 214. The data object model 214 may have defined relationships with data objects stored in the base systems, for example, certain objects in the data object model 214 may have read-only or read-write relationships with corresponding data objects in the base systems. These types of defined relationships can be enforced through the communication system built between the persistence layer 210 and the base systems. Thus, the persistence layer 210 can be used to effectively decouple application development from the underlying base systems.

The cross-functional applications 270, which take advantage of this decoupling from backend systems to drive business processes across different platforms, technologies, and organizations, can be created using a set of tools that enable efficient development of cross-functional applications 270. The cross-functional applications 270 can support semi-structured processes, aggregate and contextualize information, handle event-driven and knowledge-based scenarios, and support a high degree of collaboration in teams, including driving collaboration and transactions. The set of tools enable efficient development of the cross-functional applications 270 by providing application patterns that support model-driven composition of applications in a service-oriented architecture.

An object modeling tool 240 enables creation of new business objects in the persistency layer 210 by providing a mechanism to extend the data object model 214 dynamically according to the needs of an enterprise. A process modeling tool 250 enables creation of new business workflow and ad hoc collaborative workflow. A user interface (UI) tool 260 provides UI patterns that can be used to link new objects and workflow together and generate standardized views into results generated by the cross-functional applications 270. The object modeling tool 240, the process modeling tool 250 and the UI tool 260 thus can be used to build the components of cross-applications 270 to implement new enterprise management functions without requiring detailed coding activity.

The process modeling tool 250 can include guided procedure templates with pre-configured work procedures that reflect best practices of achieving a work objective that is part of a larger cross-functional application scenario. Such a work procedure can include contributions from several people, creation of multiple deliverables, and milestones/phases. Moreover, whenever an instantiated business object or work procedure has lifetime and status, the progress and status of the object or work procedure can be made trackable by the process owner or by involved contributors using a dashboard that displays highly aggregated data. The dashboard and a myOngoingWork place can be two UI patterns that are provided by the UI tool 260.

Whenever there is a concept of myObjects, myRecentObjects, myRelatedObjects or myPreferredObjects, then an Object Picker UI pattern, provided by the UI tool 260, can be included that let users pick their favorite object directly. Whenever people are to be searched for, either for choosing one individual person or for generating a collection of people meeting some criterion, the people finder concept should be applied. A key aspect of searching for a person can be described as an attribute within the user's activity, qualification, interest, and collaboration profile. For a given cross-application scenario, people collections can be stored as personal or shared collections using the People Finder to make them available for further operations later on.

Whenever there is a strategic view on a cross-functional application scenario, analytics of the overall portfolio can be made available in the form of a collection of UI components. A view selector can be used to display/hide components, and a component can be toggled between graphical and numerical display and can include a drop-down list or menu to select sub-categories or different views.

Cross-functional application scenarios can provide related information to the user when possible, and some parts within a larger cross-application scenario can define what kind of related information is to be offered. Heuristics can be used to identify such relatedness, such as follows: (1) information that is related to the user due to explicit collaborative relationships such as team/project membership or community membership; (2) information that is similar to a given business object in a semantic space based on text retrieval and extraction techniques; (3) recent objects/procedures of a user; (4) other people doing the same or similar activity (using same object or procedure template, having same workset); (5) instances of the same object class; (6) next abstract or next detailed class; (7) explicit relationships on the organizational or project structure; (8) proximity on the time scale; (9) information about the underlying business context; and/or (10) information about the people involved in a collaborative process.

Cross-functional applications also can include generic functionality in the form of ControlCenter Pages that represent generic personal resources for each user. These cross-applications can refer to the following pages where appropriate: (1) MyOngoingWork page: provides instant access to all dashboards that let users track their ongoing work. Ongoing work may refer to the state of business objects as well as guided procedures. (2) MyDay page: lists today's time based events that are assigned or related to the user. (3) MyMessageCenter page: Displays all pushed messages and work triggers using a universal inbox paradigm with user selected categorical filters. (4) MyInfo: Provides access to all personal info collections (documents, business objects, contacts) including those located in shared folders of teams and communities of which the user is a member. Also provides targeted search in collaborative information spaces such as team rooms, department home pages, project resource pages, community sites, and/or personal guru pages.

The enterprise management consolidation system 200 described above may be suitably employed for defining and generating roles for a project of the enterprise. Dynamically generating one or more roles for a project may include performing intelligent text mining and retrieval on multiple disparate sets of unstructured data related to a project for which roles are to be generated. Unstructured information includes data that is stored in different ways, and may be created individually and manually rather than automatically. Documents that contain, for example, body texts, pictures, and films are examples of unstructured information. Unstructured information can be contrasted with structured information in which data is largely automatically generated and organized in tables or other data structures. Data from structured information typically can be searched, sorted, and filtered more easily, and provided in the form of a report or figure more efficiently.

In one implementation, a computer-implemented method for dynamic role generation may include generating a list of skills relating to a project based on a comparison between a stored skills taxonomy and key words extracted from unstructured text associated with the project. The method also may include generating one or more role templates for the project based on a comparison of the generated list of skills and one or more predetermined project roles. Intelligent text mining on multiple sets of unstructured data related to a project may be used to extract key words from the data. The key words then are compared against a skills taxonomy. The skills taxonomy can include a qualifications catalog or an archived skills list. A match between the key words and the skills taxonomy yields a list of skills required for the project. The list of skills then is compared against other skills lists for past projects to define one or more role templates. An advantage of this technique is to reduce the tedious work of grouping skills together to define individual roles. Another potential advantage is that this technique may be used to provide a detailed proposal for roles to staff a project.

Figure 3:
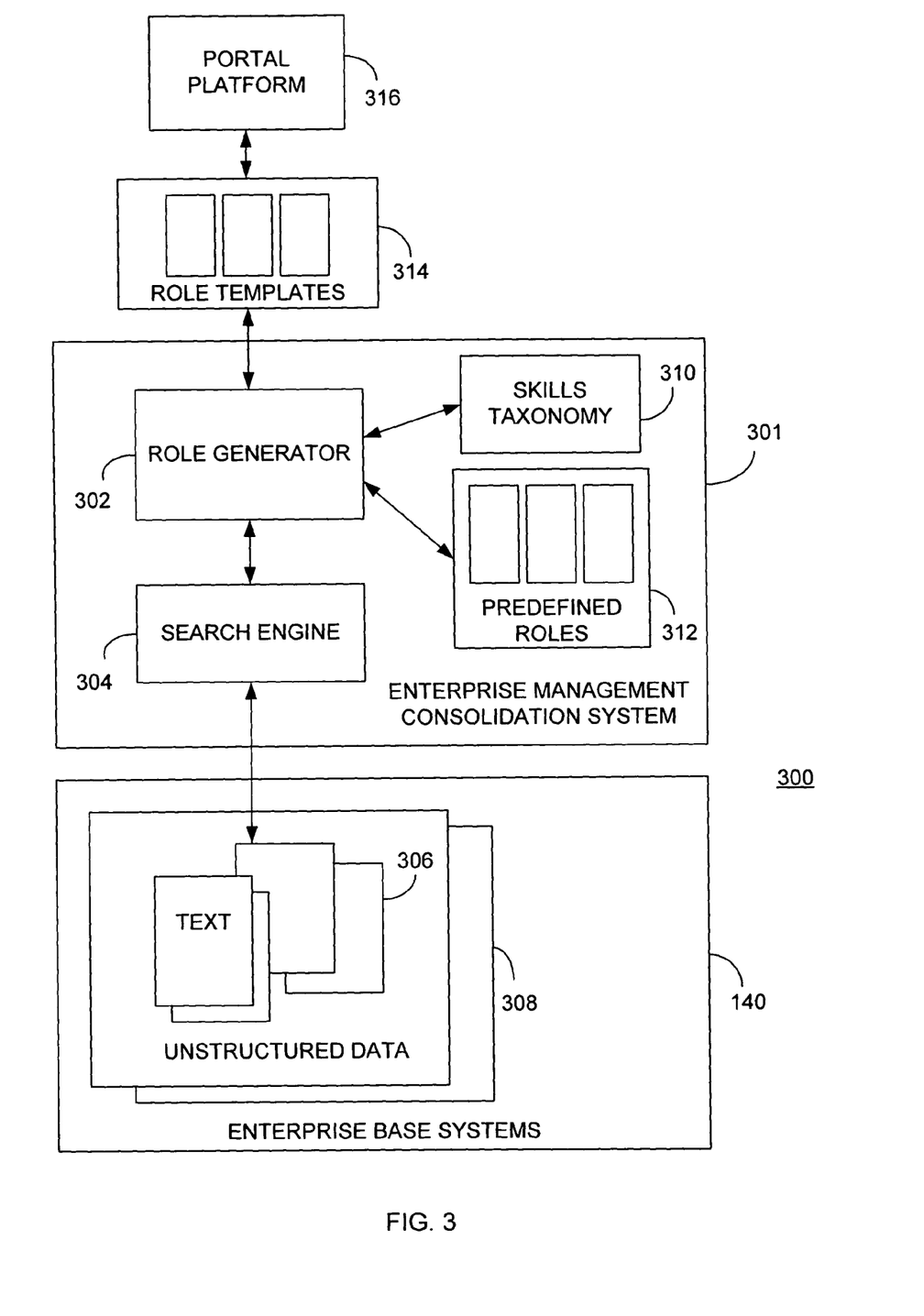
FIG. 3 is a block diagram illustrating components of a role generation system.

FIG. 3 is a block diagram of a system 300 that may be used to dynamically generate one or more roles for a project. In the pictured example, an enterprise management system 301 includes a role generator 302, which may be implemented as a module, an application, or other software-based component. The enterprise management system 301 may be a composite application environment, i.e. two or more content-driven, cross-functional integrated business applications. The role generator 302 generates one or more role templates 314 that can be used for creating roles for the project. The role templates 314 may be made available for presentation to a portal 316, or other interface, for additional configuration. Each role template 314 defines a number of skills that are desired and/or required to fulfill a role by an individual associated with the project.

The role generator 302 interacts with a search engine 304. The search engine 304 performs intelligent text mining on unstructured text 306 that is associated with the project. The unstructured text 306 is part of one or more sets of unstructured data 308. The unstructured data 308 can be stored in any medium accessible from enterprise base systems, and may be accessible across a network such as network 110 in FIG. 1. Examples of unstructured data include, but are not limited to, project plans, resource and project management databases, project graphs and charts, and the like.

An example of the search engine 304 is the Text Retrieval and Extraction (TREX) search engine provided by SAP A.G. With the TREX search engine, product descriptions can be indexed, and search terms can be searched for using one or more various search techniques, e.g. exact search, phrase search, fuzzy search, linguistic search, and the like. The TREX search engine may include a server, which may be equipped with a variety of search functions: general queries, searches for special terms, Boolean searches linked with "and" as well as a "search similar" function. In addition to linguistic queries, such as different forms of the same word, and complex searches by author or date, the TREX server also offers all search functions provided by conventional Internet search engines.

The search engine retrieves a body of unstructured text 306 from among the sets of unstructured data 308 and extracts key words from the unstructured text 306. The key words relate to certain skills or knowledge that can be attributed to individuals to whom project roles will be assigned. For example, the search engine 304 can filter unstructured body text from a project planning document that may also include graphics, charts, etc. Then, the search engine extracts and retrieves key words from the unstructured body text. The key words may include one or more noun or phrases that, based on their occurrence within the sets of unstructured data, indicate the existence of a particular skill or knowledge. For instance, recurring key words such as "portal" and "design" in unstructured text attributed to an individual within the enterprise could indicate that the individual is skilled in portal design.

The role generator 302 compares the key words with a skills taxonomy 310. The skills taxonomy 310 is a classification of predefined skills. The skills can be classified according to any number of classification systems, such as by department, by job description, etc., and may be provided as a skills catalogue in a database. The key words may be mapped to one or more skills included in the skills taxonomy 310 to create a skills list representing skills that are likely to be available within the enterprise based on the key words. The skills list may be provided as structured data that can be used toward generating a role. The role generator 302 may rank each skill in the list of skills according to the skill's relevance to the project. In one example, the role generator 302 assigns a value to each skill. The role generator 302 can include a filtering function to filter out skills from the skills list that rank below a predetermined threshold, i.e. have a value under a predetermined minimum relevance value.

The role generator 302 then compares the skills list with one or more predefined roles 312 that may be used as templates to build the new role templates 314. The predefined roles 312 can be archived roles that had been defined for past projects. The predefined roles 312 can, for example, be stored in accordance with any storage or archival arrangement, or on any type of media accessible by the role generator 302. Each predefined role 312 includes a number of skills required for that role. Each role template 314 that are generated based on the predefined roles 312 also include a number of skills required for a suggested role, which defines an information access that can be attributed to the generated role. Thus, in accordance to the example above, if the project requires a portal designer, a role template 314 can be generated for an individual having the requisite portal design skill, as well as other skills necessary or desired for fulfilling the role. The individual then will have access to information that is specialized to the role.

The role generator 302 then compares the skills list with one or more predefined roles 312 that may be used as templates to build the new role templates 314. The predefined roles 312 can be archived roles that had been defined for past projects. The predefined roles 312 can, for example, be stored in accordance with any storage or archival arrangement, or on any type of media accessible by the role generator 302. Each predefined role 312 includes a number of skills required for that role. Each role template 314 that is generated based on the predefined roles 312 also includes a number of skills required for a suggested role, which defines an information access that can be attributed to the generated role. Thus, in accordance to the example above, if the project requires a portal designer, a role template 314 can be generated for an individual having the requisite portal design skill, as well as other skills necessary or desired for fulfilling the role. The individual then will have access to information that is specialized to the role.

Figure 4:
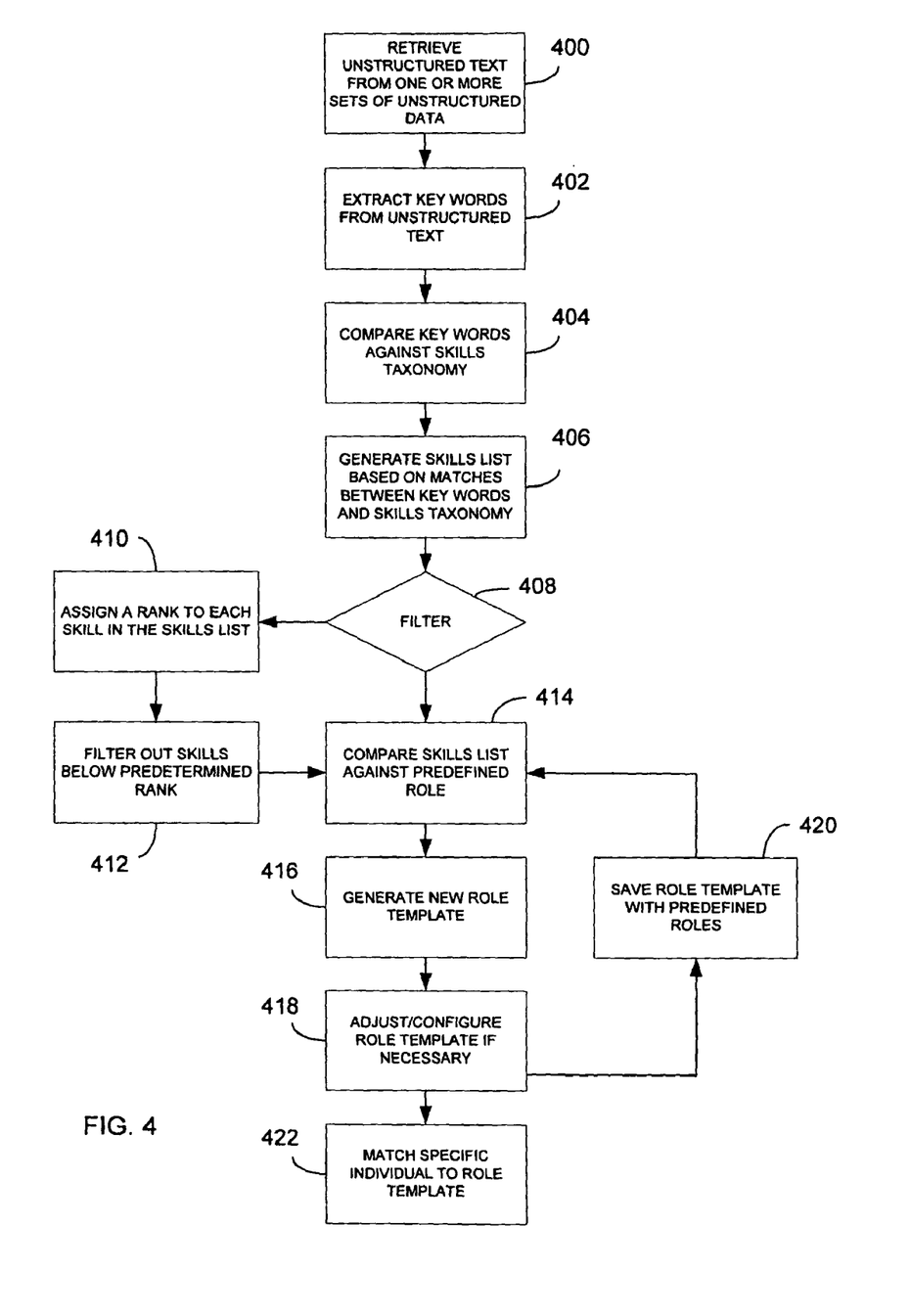
FIG. 4 is a flowchart of a process for generating one or more roles for a project.

FIG. 4 is a flowchart of a process of generating one or more roles for a project or other undertaking within an enterprise. Prior to executing the process, it shall be assumed for this example that the project and its general human resource requirements have been at least partially defined. At block 400 unstructured text is retrieved from one or more sets of unstructured data. At block 402 key words are extracted from the unstructured text. The key words can be one or more nouns or phrases related to particular skills or qualifications related to the project in accordance with the project definition or plan.

The extracted key words are compared against a skills taxonomy at block 404. The skills taxonomy includes a classification of predefined skills, and can be organized as an electronic skills catalogue in one example. Where one or more key words match text that defines a skill, each matched skill is used to generate a skills list at block 406. The skills list includes one or more skills based on the comparison between the key words and the skills taxonomy. One or more skills in the skills list may be designated as "required" or mandatory for a role. Alternatively, one or more skills may be designated as "optional" or desirable for a role. The designation of "required" or "optional" may be used to filter the skills list to remove non-relevant skills, or to match a specific individual to a role where the individual may or may not possess all skills in the skills list.

At block 408, a decision may be made whether to filter the skills list to refine the types or levels of skills included in the skills list. If filtering is selected, at block 410 a rank is assigned to each skill in the skills list. The rank may be assigned according to a degree to which the skill is relevant to the project, or other type of ranking. At block 412, skills in the skills list that fall below a predetermined threshold rank are deleted from the skills list or otherwise disregarded. The resultant filtered skills list from block 412, or the originally generated, unfiltered skills list from block 408, is compared against one or more predefined roles. The predefined roles are archived and accessed from a storage medium. In an implementation, previously-formed role templates from prior projects are accumulated to serve, in whole or part, as predefined roles for future project role generation. The predefined roles provide a model or template for generating new role templates, at 416. Accordingly, at block 416 a skills list is organized into a role according to any suitable format or data structure.

At block 418, the new role templates can be adjusted or configured as necessary or desired. In one example, a role template is provided as a form document in a graphical user interface such as a portal. A user can access and modify the role template using any available data input tools or methods. Thereafter, the roles can be assigned to individuals associated with the project. The original new role templates or modified role templates can be saved with the predefined roles at block 420, adding to the role generation history and further refining the capability to dynamically generate accurate and effective roles. At block 422 a specific individual may be matched with a role template. Thereafter, the role generator or other logic module can assign the individual to a role corresponding to the role template.

Role definitions can be used to create job descriptions for finding individuals for full- or part-time jobs, and for jobs of any duration. Role definitions can be used in various planning scenarios, including but not limited to capacity planning, recruitment planning, and contractor planning, or for contractor budgeting and recruiting, for example. Role definitions can be searched for reuse in other projects, or searched by employees, contractors, or prospective employees seeking a job. The sources of information used to generate role definitions may be continuously scanned for adding new roles.

Although a few embodiments have been described in detail above, other modifications are possible. Portions of this description discuss operation through a portal, but any of a number of access systems and methods may be used to manage collaboration sessions. Further, the logic flow of FIG. 4 does not require the particular sequential order shown, or entirety thereof, to achieve desirable results. Other embodiments may be within the scope of the following claims.

The invention claimed is:

1. A computer-implemented method for generating one or more role templates required for a project from one or more unstructured text documents associated with the project, the method comprising:

extracting, via a search engine executed by a role generator system, key words from unstructured text in the one or more documents associated with the project, wherein the one or more documents are stored on a storage medium accessible across a network;

mapping, by the role generator system, the key words extracted from the unstructured text in the one or more documents to predefined job skill definitions in a skills taxonomy;

generating, by the role generator system, a plurality of skills based, at least in part, on the predefined job skill definitions mapped to the key words extracted from the unstructured text, ranking each of the plurality of skills based on relevance to the project;

filtering any skills from the plurality of skills that rank below a predetermined threshold to produce a generated list of skills;

comparing, by the role generator system, the generated list of skills to one or more predefined role templates, each of the one or more predefined role templates including a predefined list of skills required to perform a predefined role;

when the generated list of skills at least partially matches the predefined list of skills included in a particular one of the one or more predefined role templates, generating, by the role generator system, a new role template for the project based, at least in part, on the particular predefined role template, wherein the new role template defines a role required for the project and includes at least a portion of the job skill definitions included in the particular predefined role template; and when the generated list of skills does not match the predefined list of skills included in a particular one of the predefined role templates, generating, by the role generator system, a new role template for the project based on the generated list of skills.

2. The method in accordance with claim 1, further comprising:

retrieving the unstructured text from one or more sets of unstructured data.

3. The method in accordance with claim 1, wherein the key words include at least one noun.

4. The method in accordance with claim 1, wherein the one or more predefined role templates are accessed from an archive of project roles.

5. The method in accordance with claim 4, further comprising storing the new role template in the archive of project roles.

6. The method in accordance with claim 1, wherein at least one skill in the new role template is required for the role.

7. The method in accordance with claim 1, wherein at least one skill in the new role template is optional for the role.

8. The method in accordance with claim 1, further comprising matching a specific individual with the new role template.

9. The method in accordance with claim 8, further comprising determining whether each skill in the new role template is required or optional.

10. A system for generating one or more roles required for a project comprising:

a skills taxonomy containing one or more predefined job skill definitions and one or more key words relating to the one or more predefined job skill definitions;

a storage device for storing one or more predefined role templates, wherein the one or more predefined role templates define one or more roles required for the project;

a search engine, comprising a server, for extracting unstructured text from one or more documents associated with the project and extracting key words from the unstructured text associated with the project; and a role generator, for generating one or more role templates for the project based on the key words extracted from the unstructured text in the one or more documents,
wherein the role generator is configured to:
- map the extracted key words extracted from the unstructured text in the one or more documents to the one or more predefined job skill definitions in the skills taxonomy;
- generate a plurality of skills for a project based, at least in part, on the predefined job skill definitions mapped to the key words extracted from the unstructured text;
- rank each of the plurality of skills based on relevance to the project;
- filter any skills from the plurality of skills that rank below a predetermined threshold to produce a generated list of skills;
- compare at least a portion of the generated list of skills to one or more of the predefined role templates, each of the one or more predefined role templates including a predefined list of skills required to perform a predefined role;
- generate a new role template when the generated list of skills at least partially matches the predefined list of skills included in a particular one of the predefined role templates, the new role template based, at least in part, on the particular predefined role template, wherein the new role template defines a role required for the project and includes at least a portion of the job skill definitions included in the particular predefined role template; and
- when the generated list of skills does not match the predefined list of skills included in a particular one of the predefined role templates, generate, by the role generator system, a new role template for the project based on the generated list of skills.

11. The system in accordance with claim 10, further comprising a portal for accessing the one or more role templates.

12. The system in accordance with claim 10, wherein the role generator operates in a composite application environment.

13. The system in accordance with claim 12, wherein the composite application environment includes a plurality of integrated applications.

14. The system in accordance with claim 10, wherein the role generator operates in a business application.

15. The system in accordance with claim 14, wherein the business application is a project management application.

16. The system in accordance with claim 15, wherein the business application is a human resource application.

17. The system in accordance with claim 14, wherein the business application is integrated within a composite application environment.

* * * * *